US008244309B2

(12) United States Patent
Marumoto

(10) Patent No.: US 8,244,309 B2
(45) Date of Patent: Aug. 14, 2012

(54) DRIVING RECORDER

(75) Inventor: Kyoji Marumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 478 days.

(21) Appl. No.: 12/487,334

(22) Filed: Jun. 18, 2009

(65) Prior Publication Data

US 2009/0318121 A1 Dec. 24, 2009

(30) Foreign Application Priority Data

Jun. 19, 2008 (JP) ................................ 2008-159907
Mar. 12, 2009 (JP) ................................ 2009-059033
May 12, 2009 (JP) ................................ 2009-115729

(51) Int. Cl.
*H04M 1/00* (2006.01)

(52) U.S. Cl. ............... 455/569.2; 455/414.1; 455/575.1; 701/29.1; 701/29.2; 701/29.7

(58) Field of Classification Search ............... 455/414.1, 455/569.2, 575.9; 701/29.1–29.9, 30.1–30.9, 701/33, 35, 211, 114; 370/259, 310, 338; 340/438, 539.1
See application file for complete search history.

(56) References Cited

U.S. PATENT DOCUMENTS

| | | | | |
|---|---|---|---|---|
| 6,519,241 | B1 * | 2/2003 | Theimer | 370/338 |
| 2003/0050747 | A1 * | 3/2003 | Kamiya | 701/33 |
| 2005/0033503 | A1 * | 2/2005 | Yamamoto | 701/114 |
| 2005/0137796 | A1 * | 6/2005 | Gumpinger | 701/211 |
| 2006/0020380 | A1 * | 1/2006 | Saito et al. | 701/29 |
| 2007/0173994 | A1 * | 7/2007 | Kubo et al. | 701/35 |
| 2008/0033632 | A1 * | 2/2008 | Lee | 701/117 |

FOREIGN PATENT DOCUMENTS

JP 2008-052230 3/2008

* cited by examiner

*Primary Examiner* — Lana N Le
*Assistant Examiner* — Golam Sorowar
(74) *Attorney, Agent, or Firm* — Fish & Richardson P.C.

(57) ABSTRACT

A driving recorder of the present invention is provided with: a data collecting portion that collects driving condition data of a vehicle; a storage portion that stores the driving condition data in a non-volatile manner; a communications portion that performs mutual communications with a mobile telephone terminal, using a cable or wirelessly; and a control portion that comprehensively controls these portions each provided as a functional part, wherein the control portion controls the communications portion to thereby permit the communications portion to transmit and receive the driving condition data to and from the mobile telephone terminal.

66 Claims, 6 Drawing Sheets

FIG. 6

| TIME/ DATE | POSITION | SPEED [km/h] | ACCELERATION [km/h/s] | NUMBER OF REVOLUTIONS [rpm] | |
|---|---|---|---|---|---|
| t0 | P(t0) | V(t0) | A(t0) | R(t0) | :START |
| ⋮ | ⋮ | ⋮ | ⋮ | ⋮ | |
| t1 | P(t1) | V(t1) | A(t1) | R(t1) | |
| ⋮ | ⋮ | ⋮ | ⋮ | ⋮ | |
| t2 | P(t2) | V(t2) | A(t2) | R(t2) | |
| ⋮ | ⋮ | ⋮ | ⋮ | ⋮ | |
| t3 | P(t3) | V(t3) | A(t3) | R(t3) | |
| ⋮ | ⋮ | ⋮ | ⋮ | ⋮ | |
| t4 | P(t4) | V(t4) | A(t4) | R(t4) | :STOP |
| | | | | | |
| t5 | P(t5) | V(t5) | A(t5) | R(t5) | :START |
| ⋮ | ⋮ | ⋮ | ⋮ | ⋮ | |
| t6 | P(t6) | V(t6) | A(t6) | R(t6) | SUDDEN ACCELERATION |
| ⋮ | ⋮ | ⋮ | ⋮ | ⋮ | |
| t7 | P(t7) | V(t7) | A(t7) | R(t7) | |
| ⋮ | ⋮ | ⋮ | ⋮ | ⋮ | |
| t8 | P(t8) | V(t8) | A(t8) | R(t8) | |
| ⋮ | ⋮ | ⋮ | ⋮ | ⋮ | |
| t9 | P(t9) | V(t9) | A(t9) | R(t9) | EXCESSIVE SPEEDING |
| ⋮ | ⋮ | ⋮ | ⋮ | ⋮ | |
| t10 | P(t10) | V(t10) | A(t10) | R(t10) | |
| ⋮ | ⋮ | ⋮ | ⋮ | ⋮ | |
| t11 | P(t11) | V(t11) | A(t11) | R(t11) | SUDDEN DECELERATION |
| ⋮ | ⋮ | ⋮ | ⋮ | ⋮ | |
| t12 | P(t12) | V(t12) | A(t12) | R(t12) | |
| ⋮ | ⋮ | ⋮ | ⋮ | ⋮ | |
| t13 | P(t13) | V(t13) | A(t13) | R(t13) | |
| ⋮ | ⋮ | ⋮ | ⋮ | ⋮ | |
| t14 | P(t14) | V(t14) | A(t14) | R(t14) | :STOP |

DRIVING RECORDER

This application is based on the following Japanese Patent Applications, the contents of which are hereby incorporated by reference:

(1) Japanese Patent Application No. 2008-159907 filed on Jun. 19, 2008;

(2) Japanese Patent Application No. 2009-059033 filed on Mar. 12, 2009; and (3) Japanese Patent Application No. 2009-115729 filed on May 12, 2009.

BACKGROUND OF THE INVENTION

1. Field of the Invention

The present invention relates to a driving recorder that records vehicle driving condition data (including image data and vehicle traveling data) when a traffic accident occurs or during dangerous driving, etc.

2. Description of Related Art

In recent years, as means that contributes to reducing the occurrence of traffic accidents and to perform a post-analysis, a driving recorder is mounted in more and more vehicles.

As an example of a conventional technique related to the foregoing, JP-A-2008-52230 (hereinafter, referred to as Patent Document 1) can be cited.

As a matter of fact, so long as the conventional driving recorder mentioned above is mounted in a vehicle, a driver who is unwilling to have a traffic accident caused by his or her negligence or dangerous driving recorded in that driving recorder becomes conscious of defensive driving all the times, contributing to reduce the occurrence of traffic accidents accordingly. If a driver is involved in a traffic accident despite the fact that that driver is irrelevant to negligence in the driving, analyzing thereafter driving condition data recorded in the driving recorder in his or her vehicle makes it possible to verify driver's innocence.

The conventional driving recorder as described above, however, finds applications mainly in commercial vehicles (such as taxies, buses, trucks) whereas wide spreading thereof is hardly seen in general vehicles (private cars).

One of the factors causing that situation is that the conventional driving recorder needs a personal computer as means for reading the driving condition data recorded therein, or confirming and changing an operation setting thereof; thus it is not easy for ordinary users to handle it.

For example, in the case of the conventional driving recorder, to read the driving condition data recorded therein, or to confirm and change an operation setting thereof, it is necessary to connect the conventional driving recorder directly to a personal computer via a USB (universal serial bus) cable or a LAN (Local Area Network) cable, or to exchange necessary data between the driving recorder and the personal computer using a certain medium (such as removable memory card); such work is not easily done by users (female users or elderly persons) who are not familiar to handling of the devices mentioned above.

Without a personal computer, a user cannot read the driving condition data recorded in the driving recorder or confirm and change an operation setting thereof by himself or herself at any time; accordingly, the driving recorder is barely used except for the purpose of providing information recorded in the driving recorder to a police station or insurance company in case the user encounters a traffic accident. Therefore, the conventional driving recorder is somewhat less appealing than that encouraging consumers to buy.

Moreover, it is rarely the case that a user, even if owing a personal computer, brings it with him or her when driving a car; accordingly, the user cannot read the driving condition data recorded in the driving recorder immediately after he or she encountered a traffic accident. Thus, it is impossible, while looking at the driving condition data recorded in the driving recorder, to report a status of the accident to a police station or to insist on his or her innocence to another party involved in that accident, and hence, it is impossible to sufficiently enjoy a benefit that would be obtainable if the driving recorder is mounted in a vehicle.

The driving condition data is very useful for analyzing a status of a vehicle-related accident, particularly after it has occurred. Thus, it is preferable that leakage of the driving condition data be prevented as much as possible.

SUMMARY OF THE INVENTION

In view of the above-described problems, an object of the present invention is to provide a driving recorder offering enhanced user-friendliness.

To achieve the above object, a driving recorder of the present invention is provided with: a data collecting portion that continuously collects driving condition data of a vehicle; a storage portion that stores the driving condition data in a non-volatile manner; a communications portion that performs mutual communications with a mobile telephone terminal, using a cable or wirelessly; and a control portion that comprehensively controls the data collecting portion, the storage portion, and the communications portion, each provided as a functional part, wherein the control portion controls the communications portion to thereby permit the communications portion to transmit and receive the driving condition data and operation setting data to and from the mobile telephone terminal. Thus, it is possible to provide a driving recorder offering enhanced user-friendliness.

These and other features, constituent elements, steps, benefits, and characteristics of the present invention will be apparent from the following description of a preferred embodiment thereof taken in conjunction with the accompanying drawings.

BRIEF DESCRIPTION OF THE DRAWINGS

FIG. 6 is a table showing an example of driving condition data.

DETAILED DESCRIPTION OF PREFERRED EMBODIMENTS

Figure 1:
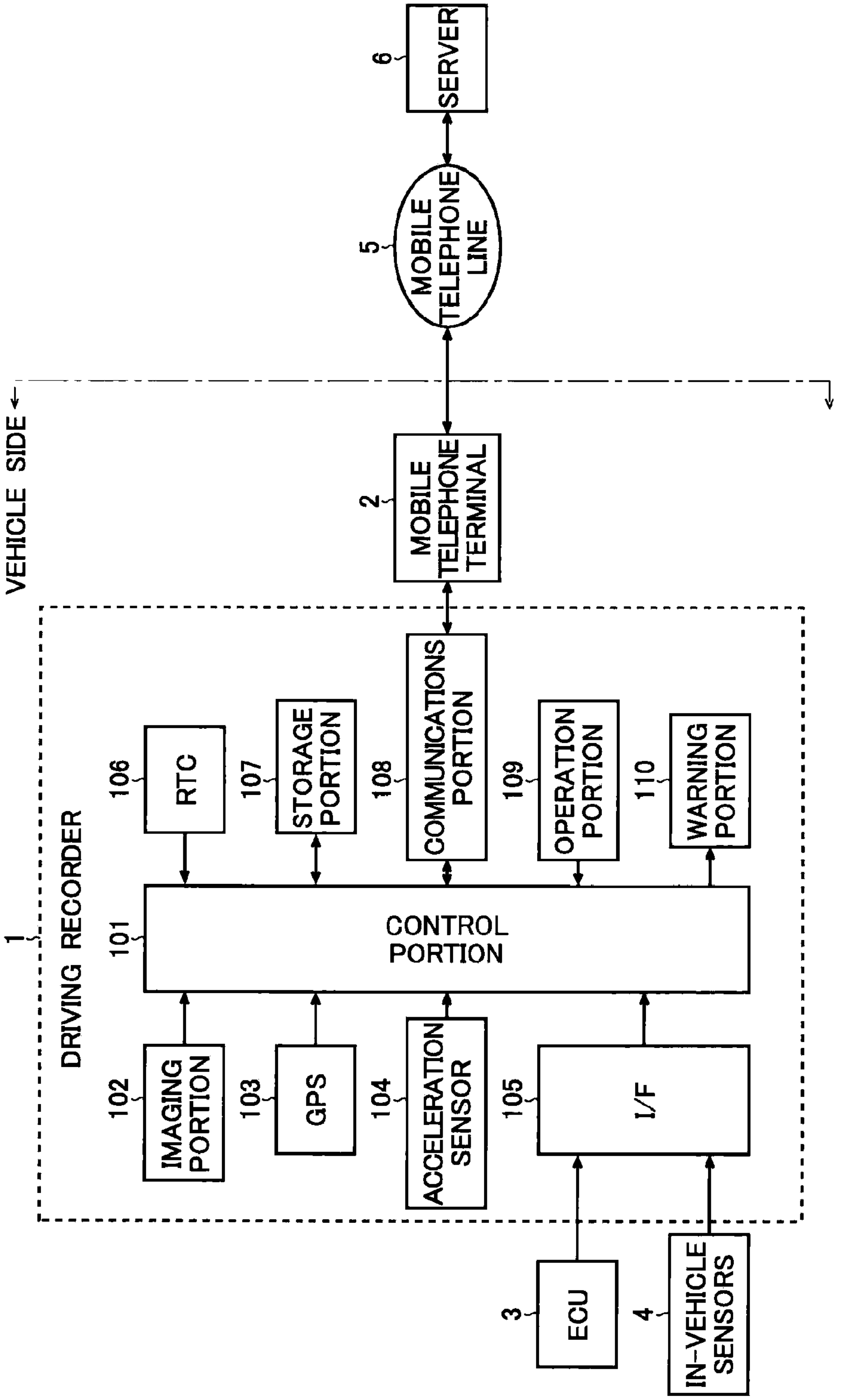
FIG. 1 is a block diagram showing a traffic information system using a driving recorder according to one embodiment of the present invention.

FIG. 1 is a block diagram showing a traffic information system using a driving recorder according to one embodiment of the present invention.

As shown in FIG. 1, the traffic information system of this embodiment includes: a driving recorder 1; a mobile telephone terminal 2; an electric control unit 3 (hereinafter, simply referred to as ECU 3); a plurality of in-vehicle sensors 4; a mobile telephone line 5; and a server 6.

The driving recorder 1 records driving condition data of a vehicle (including image data and traveling data) when a traffic accident occurs or in the course of dangerous driving, etc. A construction and an operation of the driving recorder 1 will be described in detail later.

The mobile telephone terminal 2 is brought into the interior of a vehicle by a driver of that vehicle (or another person on board), and is equipped with not only a basic function that enables call-making or communications via a mobile telephone line 5, using a radio wave, but also an additional function that enables mutual communications with the driving recorder 1, using a cable or wirelessly. How the driving recorder 1 and the mobile telephone terminal 2 work together will be described in detail later.

The ECU 3, being mounted in a vehicle, controls an operation of each part of that vehicle and, from the ECU 3, operating condition data of each part of the vehicle is transported to the driving recorder 1 so as to form part of the driving condition data, the operating condition data including lighting condition data of various lights (such as head light, tail light, blinker light, and hazard light), door-lock and -unlock condition data, side-mirror folding and unfolding condition data, windshield-wiper operating condition data, power-window operating condition data, airbag operating condition data, ABS (Antilock Brake System) operating condition data, and the like.

Each of the in-vehicle sensors 4, being mounted in a vehicle, detects a condition of each corresponding part of that vehicle and ambient conditions around that vehicle; examples of the sensor 4 include an acceleration sensor detecting acceleration generated in the front and rear directions and in the left and right directions of the vehicle, a yaw rate sensor detecting a rotation speed (self-rotation speed) around a vertical axis of the vehicle, a vehicle speed sensor detecting a traveling speed of the vehicle, a wheel speed sensor detecting a rotation speed of a wheel (tire), a steering angle sensor detecting a steering angle of a steering wheel, a steering torque sensor detecting a steering torque of a steering wheel, a brake pedal sensor detecting how much a brake pedal is pressed, a hydraulic pressure sensor detecting a hydraulic pressure of each part of the vehicle, an air pressure sensor detecting an air pressure of a tire, a temperature sensor detecting temperatures inside and outside the vehicle, an ambient light sensor detecting illumination around the vehicle, a road surface sensor detecting a condition of a road surface, a vehicle-to-vehicle distance sensor detecting a distance from vehicles running in front and behind the self-vehicle, an obstacle sensor (corner sensor) detecting the presence of any obstacle around the vehicle, and a collision sensor detecting a collision occurring to the vehicle. Various data thus detected by the in-vehicle sensors 4 is transported from those sensors 4 to the driving recorder 1 as part of the vehicle driving condition data.

The mobile telephone line 5 is a public telephone line to which the mobile telephone terminal 2 is connected, and is provided by a telecommunication carrier.

The server 6 performs communications with the mobile telephone terminal 2 via the mobile telephone line 5, and is disposed in a police station, insurance company, and the like.

Next, a construction and an operation of the driving recorder 1 will be described in detail. As shown in FIG. 1, the driving recorder 1 is provided with: a control portion 101; an imaging portion 102; GPS (Global Positioning System) receiver 103; an acceleration sensor 104; an interface 105; a real-time clock 106 (hereinafter, simply referred to as RTC 106); a storage portion 107; a communications portion 108; an operation portion 109; and a warning portion 110.

The control portion 101 comprehensively controls the aforementioned portions 102 to 110 each provided as a functional part, and includes not only a CPU (Central Processing Unit), but also a storage portion such as ROM (Read Only Memory) and RAM (Random Access Memory) (none of which is shown in the figures). The ROM is used as a storage area in which programs executed by the CPU and the like are stored. The RAM is used as a working area for the CPU and also used as a buffer area in which the driving condition data is stored temporarily (for several seconds to several minutes). An operation of the control portion 101 will be described in detail later.

The imaging portion 102 is provided with: a camera portion that all the times shoots a moving image of surroundings of the vehicle (at least the front of the vehicle), and an image processing portion that performs predetermined image processing (including analog/digital conversion, noise elimination, color correction, image compression, and the like) on image data so obtained (none of which is shown in the figures) . As a photoelectric conversion device forming the camera portion here, a CCD (charge coupled device) or a CMOS (complementary metal oxide semiconductor) may be used. Moreover, it is preferable that the imaging portion 102 be fitted in a position (on a back surface of a rearview mirror, and the like) where a condition of the vehicle front can be properly shot in the form of a moving image, and which does not block a driver's field of view. With this construction, the image data captured as a moving image of the surroundings of the vehicle is included as part of the driving condition data, helping perform a smooth and appropriate analysis of a cause of a traffic accident.

Although the embodiment described in the foregoing deals with the construction permitting the surroundings of the vehicle to be shot at all times as a moving image, this is not meant to limit how the present invention is practiced; for example, the moving image shooting may be performed intermittently at predetermined intervals, or otherwise still image shooting may be performed. This arrangement helps reduce capacity of the RAM incorporated in the control portion 101 and that of the storage portion 107.

The GPS receiver 103 outputs, to the control portion 101, vehicle positional data (composed of latitude, longitude, and altitude) indicating a current position of the vehicle, using a satellite signal from a GPS satellite. As described above, the positional data is included as part of the driving condition data, thereby making it possible to post-analyze a traveling route leading led to a traffic accident.

The acceleration sensor 104 detects three different axis directions that are orthogonal to each other (x-axis direction (i.e., in a direction in which the vehicle advances), y-axis direction (i.e., in left and right directions of the vehicle), z-axis direction (i.e., in upper and lower directions of the vehicle)), and outputs them as the acceleration data to the control portion 101. As a method for detecting acceleration, a piezoresistor or capacitance type may be employed. In this way, acceleration data indicating an increase in the speed is included as part of the driving condition data, thereby making it possible to post-analyze an impact received by the vehicle when it crashed.

The interface 105 outputs the operating condition data of each part of the vehicle inputted from the ECU 3 mounted in the vehicle, and various data detected by the in-vehicle sensors 4 and inputted therefrom. Thus, not only information obtained by the driving recorder 1 itself, but also information obtained from outside the driving recorder 1 (e.g., equipment already mounted in the vehicle, such as the ECU 3 and the in-vehicle sensors 4) are included as part of the driving condition data, thereby making it possible to collect various kinds data forming the driving condition data, with no increase in the size and cost of the driving recorder 1.

The RTC 106 outputs temporal data concerning date and time to the control portion 101. Thus, the date and time are included as part of the driving condition data, thereby making it possible to post-analyze progress leading to a traffic accident as time varies.

As described above, in the driving recorder 1 of this embodiment, the imaging portion 102, the GPS receiver 103, the acceleration sensor 104, the interface 105, and the RTC 106 each function as part of the data collecting portion that collects the driving condition data in a time series. The arrangement described above is not, however, intended to limit how the present invention; for example, the GPS receiver 103 and the acceleration sensor 104 incorporated inside the body of the driving recorder 1 may be otherwise connected to the driving recorder 1 as external components, and part of the in-vehicle sensors 4 which is disposed outside the driving recorder 1 may be otherwise incorporated inside the body of the driving recorder 1.

The storage portion 107 is formed such that, when a predetermined trigger condition (described in detail later) is satisfied, the storage portion 107 stores, in a non-volatile manner, the driving condition data buffered in the control portion 101, and may employ a semiconductor memory such as flash memory, EEPROM (Electrically Erasable and Programmable Read Only Memory), or large-capacity storage device such as hard disc drive. The storage portion 107 may be attachable and detachable with respect to the driving recorder 1 if versatility of the driving condition data is prioritized, or may be undetachable from the driving recorder 1 if prevention of tampering of the driving condition data is prioritized. A content of the driving condition data stored in the storage portion 107 are not limited to the kinds described above; all the data inputted in the control portion 101 may be stored in the storage portion 107 if sufficient post-accident investigation is prioritized, or otherwise only part of the data inputted in the control portion 101 may be stored in the storage portion 107. Moreover, the above-described driving condition data may be stored being encrypted to thereby prevent unauthorized copying of the driving condition data.

The communications portion 108 performs mutual communications with the mobile telephone terminal 2, using a cable or wirelessly. Establishing cable-based connection between the driving recorder 1 and the mobile telephone terminal 2 may use a USB port or an UART (Universal Anachronous Receiver Transmitter) port. Wireless connection between them may use an infrared communications (IrDa: Infrared Data Association) port or a wireless LAN (Local Area Network) port (or a Wi-Fi port), or a Bluetooth (registered trademark) port. That is, the communications portion 108 is so arranged as to perform mutual communications with the mobile telephone terminal 2 via a general-purpose communication port mounted in the mobile telephone terminal 2. This construction makes it possible to ensure mutual communications between the driving recorder 1 and the mobile telephone terminal 2 with no need to provide additional hardware to the mobile telephone terminal 2 or to modify specifications of the mobile telephone terminal 2.

The operation portion 109 receives user operation, and is formed with a bottom, switch, touch panel, and the like.

The warning portion 110 gives, based on a command from the control portion 101, a warning to a driver that he or she should refrain from dangerous driving. This warning is warning may be given using a sound or an image (or a combination of both). With a construction permitting such a warning to be issued, a driver comes to be conscious of defensive driving all the times; this contributes to reduce the occurrence of traffic accidents. Note that when detecting sudden starting, abrupt steering, hard braking, sudden gear change, no lighting at night, and lane change unaccompanied by operation of a blinker, uncontrolled steering, abrupt narrowing of a headway distance to another vehicle or a building around the vehicle, and the like, the control portion 101 sends a command to the warning portion 110 so that the warning portion 110 gives the above-described warning. The warning portion 110 serves as a section for alerting a driver in a case where a traffic-accident-related information sharing service which will be described later is offered to that driver.

Next, an operation of storing the driving condition data performed by the control portion 101 will be described in detail. When the acceleration of the vehicle detected by the acceleration sensor 104 exceeds a predetermined threshold value (when an impact exceeding a predetermined threshold value is given to the vehicle), when the operation portion 109 receives predetermined user operation (pressing of a traffic accident reporting button), when the control portion 101 receives a request from the mobile telephone terminal 2 via the communications portion 108 or determines that it is necessary to a warning through the warning portion 110, the control portion 101 determines that a predetermined trigger condition is satisfied, and then controls the storage portion 107 to thereby permit the storage portion to store the driving condition data. Here, the driving condition data stored in the storage portion 107 refers to the driving condition data temporarily stored in the RAM of the control portion 101 for a predetermined time (several seconds to several minutes) before and after the above-described trigger condition is satisfied.

Thus, with the driving recorder 1 mounted in the vehicle, a driver unwilling to have a traffic accident caused by his or her negligence recorded therein bears safe driving in mind all the times; this contributes to reduce the occurrence of traffic accidents. If a driver is involved in a traffic accident despite the fact that that driver is irrelevant to negligence in driving, it is possible to verify that the driver is innocent by analyzing afterwards the driving condition data recorded in the driving recorder 1.

Next, how the control portion 101 enables the driving recorder 1 and the mobile telephone terminal 2 to work together will be described in detail.

As described above, the driving recorder 1 of this embodiment is provided with the communications portion 108 that performs mutual communications with the mobile telephone terminal 2, using a cable or wirelessly; the control portion 101 controls the communications portion 108 to thereby permit the communications portion to transmit and receive, to and from the mobile telephone terminal 2, the above-described driving condition data and operation setting data for setting an operation of the driving recorder 1 (e.g., a trigger condition for determining, based on the present driving condition data, whether or not a traffic accident or dangerous driving occurs, and firmware executed by the control portion 101).

With this construction, it is possible to read the driving condition data recorded in the driving recorder 1, and to confirm and change the operation setting of the driving recorder 1, using the mobile telephone terminal 2, which is predominantly widespread compared with a personal computer; thus, it is possible to provide the driving recorder 1 offering enhanced user-friendliness.

For example, when a driver encounters a traffic accident, that driver can read, without delay, the driving condition data recorded in the driving recorder 1, using his or her own mobile telephone terminal 2; thus, it is possible to promptly and correctly report a present condition facing the driver to a relevant police station or insurance company.

When a driver encounters a traffic accident in which another party is involved, that driver can negotiate with the other party which of the parties must claim more responsibility for the cause of the accident; thus, that driver is free from concern that he or she might be defeated by the other party with one-sided insistence and forced to suffer a disadvantage. Moreover, since a party assuming a more responsibility for the accident is placed under undue stress that he or she is obliged to pay compensation, it helps contribute to improve driving manners and to reduce fake traffic accidents carried out by a fraud.

Moreover, in the driving recorder 1 of this embodiment, the control portion 101 is arranged such that the control portion 101, when determining that the above-described trigger condition is satisfied, controls the storage portion 107 to thereby permit the storage portion 107 to store the driving condition, and simultaneously controls the communications portion 108 to thereby permit the communications portion 108 to automatically send the driving condition data to the mobile telephone terminal 2. With this construction, the driving condition data recorded in the driving recorder 1 is automatically sent onto the mobile telephone terminal 2 with no need for any driver operation; this makes it easy to read the driving condition data.

The mobile telephone terminal 2 of this embodiment is provided with a transfer functional part (not shown) that transfers the driving condition data, upon receiving it from the driving recorder 1, to a predetermined server 6 via the mobile telephone line 5. This construction permits the mobile telephone terminal 2 itself to report, when a traffic accident occurs, a condition of that accident to a police station or insurance company; thus, even if a driver is unconscious in a serious condition or in a stupor, it is possible to accomplish reporting of an accident without delay. Moreover, this leads to prevention of tampering of the driving condition data.

Moreover, the mobile telephone terminal 2 of this embodiment is provided with a transmission request functional part (not shown) that, when receiving predetermined user operation, sends, to the driving recorder 1, a request for transmitting the driving condition data. With this configuration, it is possible to use the mobile telephone terminal 2 like a remote controller of the driving recorder 1.

Moreover, the mobile telephone terminal 2 of this embodiment is formed with a transmission request functional part (not shown) that sends, in response to a request from the server 6, to the driving recorder 1 a request for transmitting the driving condition data.

For example, the server 6, when recognizing a traffic accident having occurred at a certain location, sends, to unspecified plural mobile telephone terminals 2 within an area for which a base station nearby that location is responsible, information concerning time and a location at which the accident occurred, namely time information and positional information of that accident scene, and simultaneously sends, to those mobile telephone terminals 2, requests for transferring the driving condition data recorded in the corresponding driving recorders 1 working together therewith (i.e., driving condition data transfer requests). The mobile telephone terminals 2, on receiving these transfer requests, respectively send, to the corresponding driving recorders 1, requests for transmitting the driving condition data (i.e., driving condition data transmission requests) and, the terminals 2, when receiving the requested driving data from the corresponding driving recorders 1, respectively proceed to transfer it to the server 6 via the mobile telephone line 5.

Building of such a traffic information system leads to the server 6 improving its ability to collecting information, ensuring that a post-accident analysis is carried out more accurately.

Preferably, the transfer functional part of the mobile telephone terminal 2, prior to the above-described transfer operation, analyzes time data and vehicle positional data included in the driving condition data, and the time information indicating when the accident occurred and the positional information of the accident scene received from the server 6 and, only when determining that there is a strong possibility that the driving condition data recorded in the driving recorder 1 is useful for a post-accident analysis, namely that a condition of that accident is recorded in the driving recorder 1, proceeds to transfer the driving condition data to the server 6. With this construction, it is possible to reduce unwanted communication traffic of the mobile telephone line 5, and to facilitate a post-accident analysis.

Moreover, the transmission request functional part and the transfer functional part of the mobile telephone terminal 2 are specifically provided that are necessary only for enabling the mobile telephone terminal 2 to work together with the driving recorder 1 or for building the above-described traffic information system. Thus, as means for realizing these functional parts, it is a preferable that, instead of adding necessary hardware, a predetermined program be installed in the mobile telephone terminal 2 to thereby permit an arithmetic processing portion (not shown) executing that program to function as the transmission functional part and the transfer functional part in software. With this construction, it is possible to realize cooperative working of the driving recorder 1 and the mobile telephone terminal 2, and building of the above-described traffic information system, with no need to provide additional hardware to the mobile telephone terminal 2 or to modify the mobile telephone terminal 2.

Figure 2:
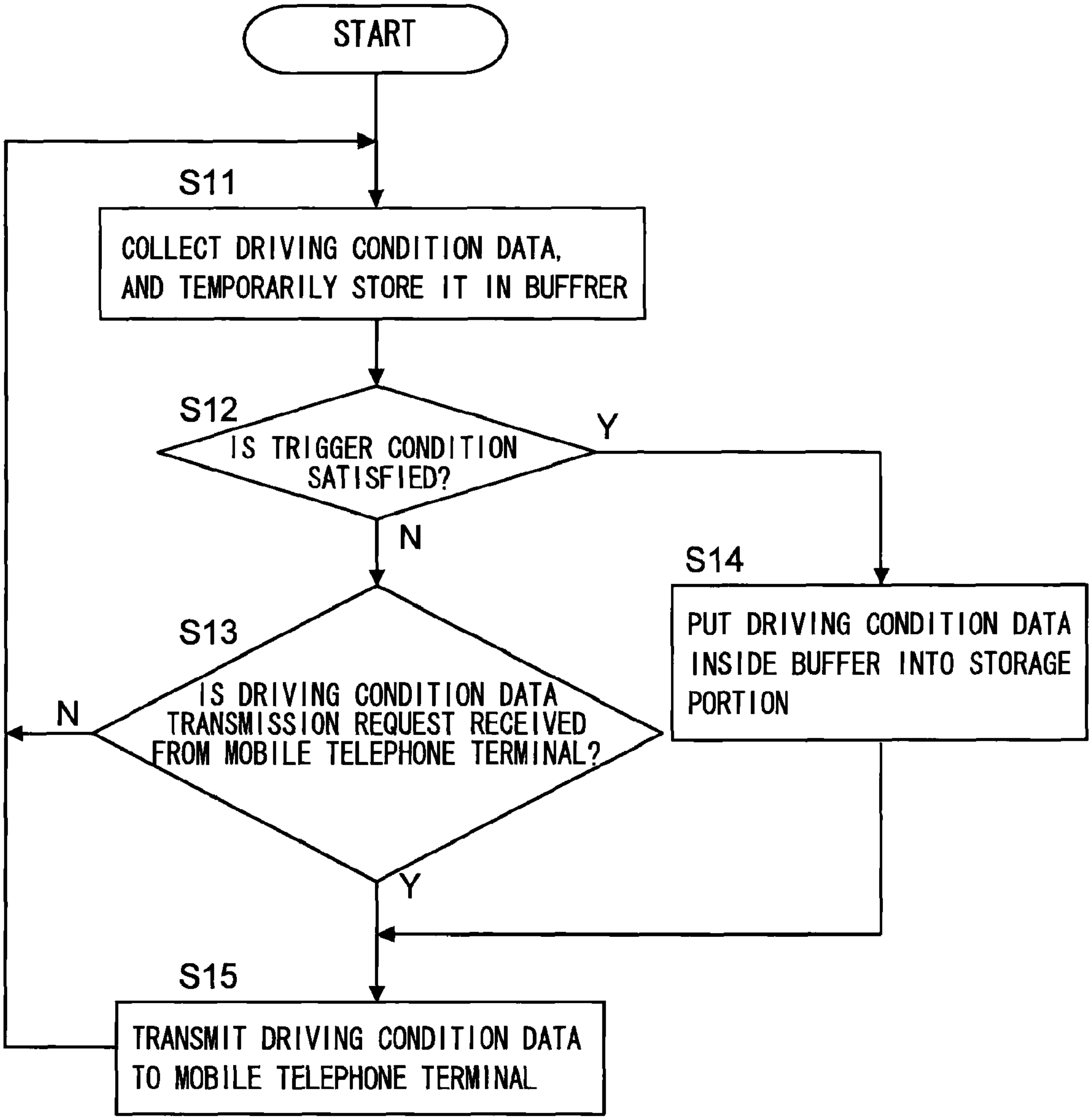
FIG. 2 is a flowchart showing an operation performed by a driving recorder (of a conditional storage design)

The above-described driving recorder 1 is so designed as to store, when the trigger condition is satisfied, the driving condition data into the storage portion 107 in a non-volatile manner (for the sake of simplicity, hereinafter, referred to as "conditional storage design"). An outline of an operation performed by the driving recorder 1 of the conditional storage design is shown in a flowchart of FIG. 2.

That is, the driving recorder 1 repeatedly performs: an operation of collecting the driving condition data and temporarily storing it into a buffer (the RAM, etc., of the control portion 101) (step S11); an operation of monitoring whether or not the trigger condition is satisfied (step S12); and an operation of monitoring whether or not the driving condition data transmission request is received from the mobile telephone terminal 2 (step S13).

Then, when the trigger condition is satisfied (Yes in step S12), the driving recorder 1 puts, in the storage portion 107 in a non-volatile manner, the driving condition data stored in the buffer (step S149), and then transmits it onto the mobile telephone terminal 2 (step S15). When receiving the driving condition data transmission request from the mobile telephone terminal 2, the driving recorder 1 transmits that data to the mobile telephone terminal 2 (step S15). When the requested data transmission is thus completed, the ongoing process returns to step S11.

With the driving recorder 1 of the conditional storage design as described above, it is possible to accomplish the storage of the driving condition data in the storage portion

107 efficiently (i.e., only when the trigger condition is satisfied). Thus, it is possible to reduce, as much as possible, a processing load imposed in recording the driving condition data, and to reduce an increase in the capacity of the storage portion 107.

On the other hand, when the driving recorder 1 is so designed as to make the driving condition data constantly stored without interruption in the storage portion 107 (namely, in a non-volatile manner) (for the sake of simplicity, hereinafter, the design being referred to as "constant storage design"), it is possible to prevent leakage, for some reasons, of the driving condition data recorded therein as much as possible. Thus, the driving recorder 1 of the "constant storage design" facilitates a post-accident analysis of a cause and the like, compared with that of the "conditional storage design."

For example, when a person or bicycle makes light contact with the vehicle, there is a possibility that an impact received by the vehicle at that time is too small, and that the trigger condition is not satisfied (a value detected by the acceleration sensor does not exceed a predetermined threshold value). In that case, with the driving recorder of the "conditional storage design," the driving condition data at the time when the relevant contact occurs is not stored in the storage portion 107. This makes it difficult to check the corresponding part of the driving condition data afterwards.

However, with the driving recorder 1 of the "constant storage design," the driving condition data when the relevant contact occurs is also recorded therein, thus making it possible to check the corresponding part of the driving condition data even after that contact occurred. Consequently, it is possible to use the driving condition data for a post-accident analysis of a cause and the like. It is undeniable that there is a possibility that, for a case where a malfunction occurs to the sensors, whether or not the trigger condition is satisfied may be determined incorrectly (thus, even when the trigger condition has been satisfied in a practical sense, it may not be determined that the trigger condition has been satisfied). Even in such an event, it is possible to prevent leakage of the driving condition data so long as the driving recorder 1 of the "constant storage design" is employed.

In the case of the driving recorder 1 of the "constant storage design," it is advised that the driving condition data is continuously collected without interruption, and temporarily stored into the buffer (RAM, etc., of the control portion 101), and all the driving condition thus temporarily stored is then transferred to the storage portion 107 regardless of whether or not the trigger condition is satisfied. Moreover, in the case of the driving recorder 1 of the "constant storage design," the driving condition data continuously collected without interruption may be directly stored in the storage portion 107 without passing through the buffer. In any case, during the operation of the driving recorder 1 (e.g., while a power switch of the driving recorder 1 remains on), the driving condition data is continuously collected without interruption, and is then stored in the storage portion 107 in the non-volatile manner.

In an operation of storing the driving condition data in the storage portion 107, for example, when a storage area for the driving condition data inside the storage portion 107 is filled, an area in which the oldest data has been stored may be overwritten with the latest data. With this arrangement, it is possible to prevent shortage of the storage area for the driving condition data, and to retain in the storage area newer data, for being considered to be more important, with higher priority.

Moreover, in the driving recorder 1 of the "constant storage design," basically, the operation of storing the driving condition data in the storage portion 107 is repeatedly performed without interruption; however, there may be any means for disabling the operation in case (e.g., a switch for disabling the operation). Moreover, only part of the driving condition data may be constantly stored in the storage portion 107.

For example, the driving condition data may be arranged such that, of all the driving condition data, only the image data captured by the imaging portion 102 is constantly stored without interruption in the storage portion 107, and that the other driving condition data is stored in the storage portion 107 only when the trigger condition is satisfied. With this arrangement, it is possible to prevent part of a captured image from being missed, and to reduce as much as possible an increase in a processing load, etc, involved in storing the data into the storage portion 107.

The imaging portion 102 may capture, instead of the image data of the surroundings of the vehicle, or in addition to that image data, image data of the interior of the vehicle. Thus, it is possible to store the image data of the interior of the vehicle into the storage portion 107. Consequently, for example, even when a trouble occurs between a driver and a passenger, it is possible to check the condition of that trouble afterwards. Moreover, with a plurality of camera portions (imaging devices) disposed inside and outside the vehicle, the imaging portion 102 may capture images of the surroundings of and the interior of the vehicle from various positions and angles.

Figure 3:
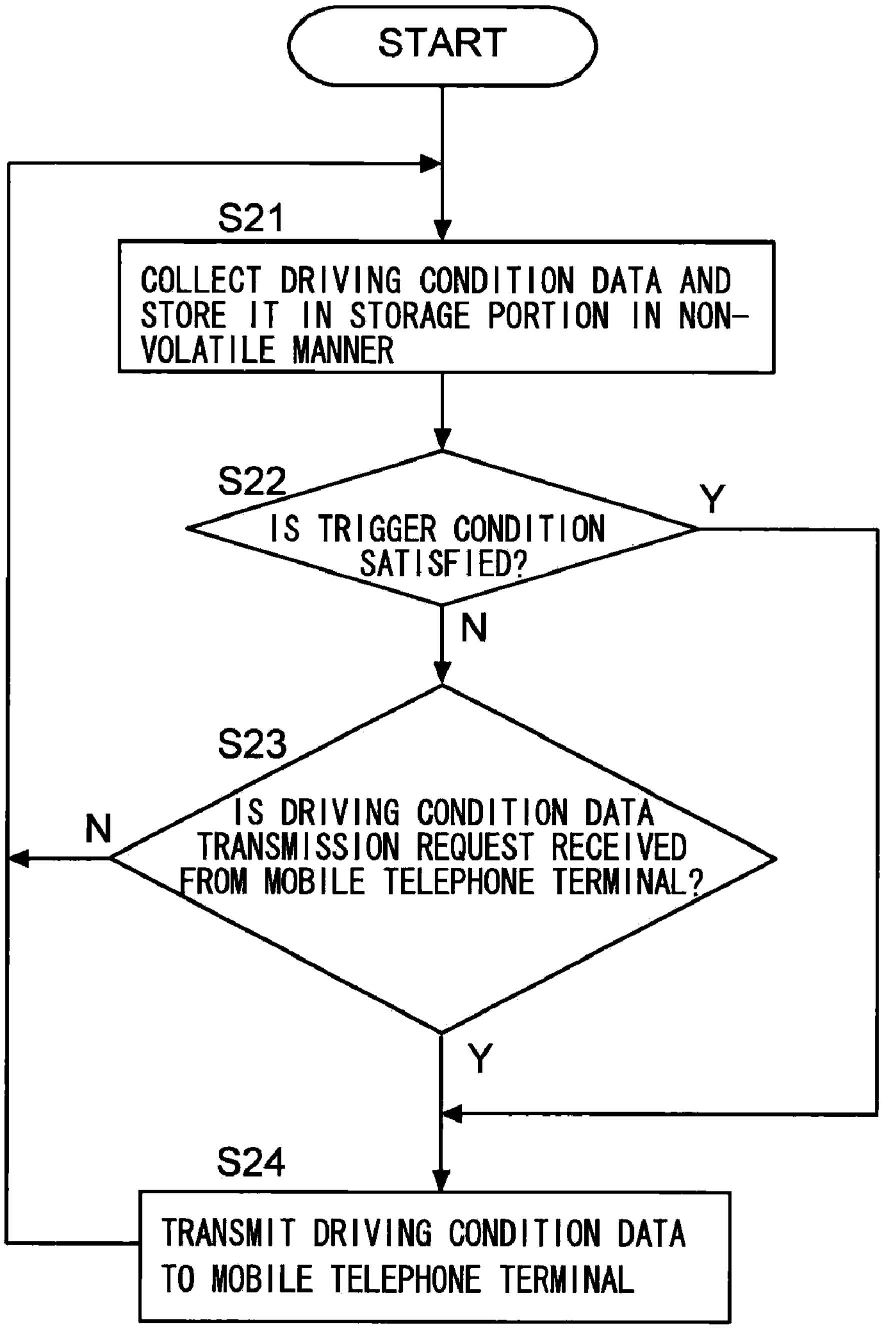
FIG. 3 is a flowchart showing an operation performed by a driving recorder (of a constant storage design)

Moreover, an outline of an operation performed by the driving recorder 1 of the "constant storage design" is shown in a flowchart of FIG. 3.

That is, the driving recorder 1 repeatedly performs: an operation of collecting the driving condition data and storing it into the storage portion 107 in the non-volatile manner (step S21); an operation of monitoring whether or not the trigger condition is satisfied (step S22); and an operation of monitoring whether or not the driving condition data transmission request is received from the mobile telephone terminal 2 (step S23).

Then, when the trigger condition is satisfied (Yes in step S22), or when the driving condition data transmission request is received from the mobile telephone terminal 2 (Yes in step S23), the driving recorder 1 sends the relevant driving condition data to the mobile telephone terminal 2 (step S24). When the requested data transmission is thus completed, the ongoing process returns to step S21.

The driving recorder 1 may be, for example, formed such that one and the other of the conditional storage design and the constant storage design can be set at a time (namely, the design can be switched between them) in accordance with a user command (user operation through the operation portion 109, and the like). Thus, it is possible to enhance user-friendliness of the driving recorder 1. Moreover, as the driving condition data handled by the driving recorder 1, other than the kinds specifically described in the foregoing, various kinds of data can be adopted that indicate conditions of the driving (e.g., whether or not the relevant vehicle is being driven, how that vehicle is driven, and the like).

As described above, the driving recorder 1 of the "constant storage design" is provided with: the functional part (data collecting and storage portion) that collects the driving condition data of a vehicle, and then stores it in the non-volatile manner; the functional part (communications portion) that performs mutual communications, using a cable or wirelessly, with the mobile telephone terminal 2; and the functional part (control portion) that comprehensively controls those functional parts mentioned above, and the control portion controls the communications portion to thereby permit the communications portion to transmit and receive the driving condition data and the operation setting data to and from the mobile telephone terminal 2, and also controls the data collecting and storage portion to thereby permit the data collecting and storage portion to continuously without interruption collect and store the driving condition data.

The driving recorder 1 thus constructed makes it easy to let the driving condition data read and to check and change the operation setting thereof, using the mobile telephone terminal 2, leading to enhanced user-friendliness of the driving recorder 1. Moreover, the driving condition data is continuously collected without interruption and stored in the non-volatile manner, thus making it possible to prevent leakage of the driving condition data as much as possible.

Figure 4:
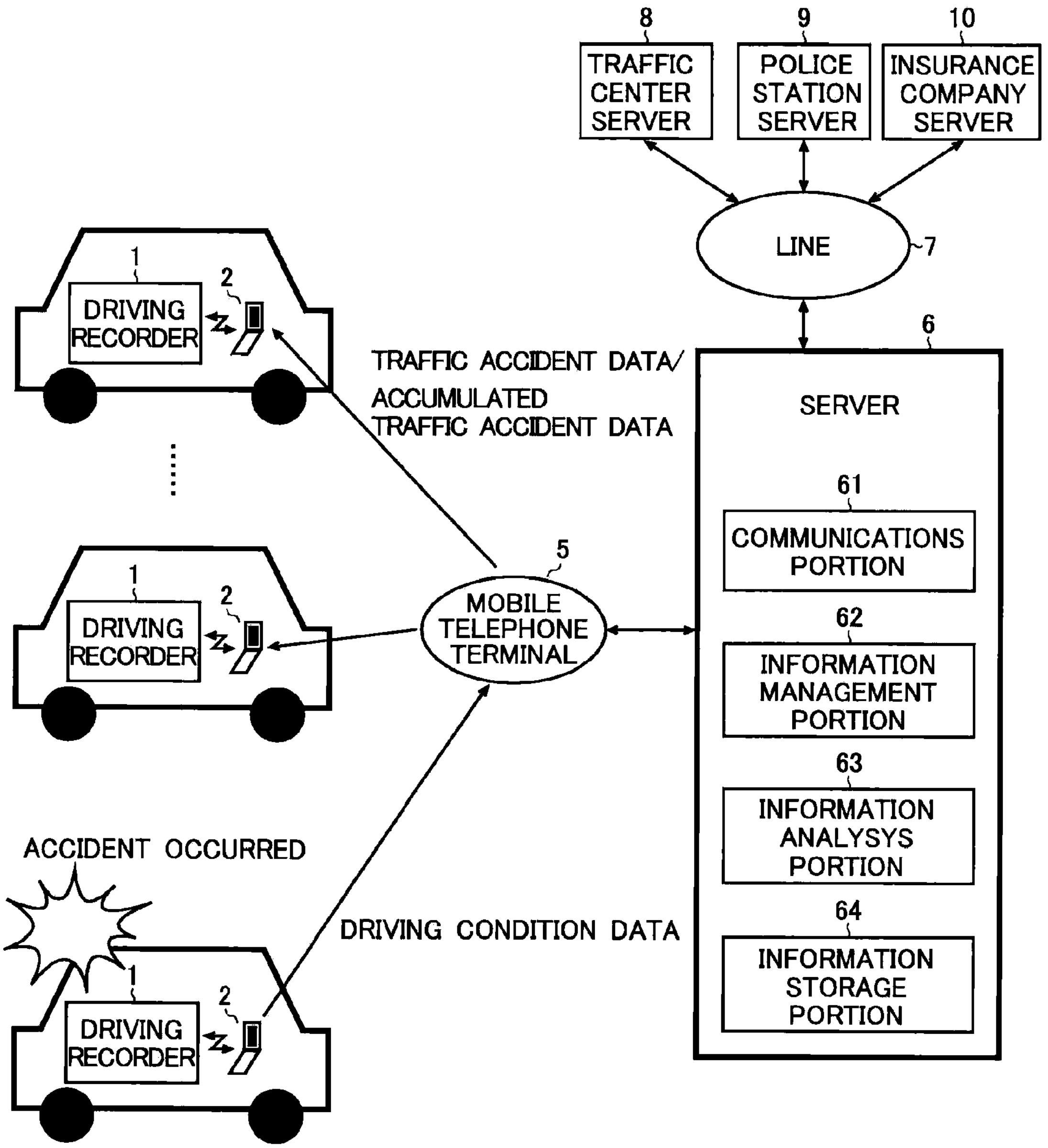
FIG. 4 is a schematic diagram illustrating a traffic-accident-related information sharing service.

Next, a service for sharing information concerning traffic accidents (i.e., traffic-accident-related information sharing service) for which the server 6 plays a main roll will be described in detail with reference to FIG. 4. As shown in FIG. 4, the server serving as a main part in realizing the above-described function is provided with: a communications portion 61; an information management portion 62; an information analysis portion 63; and an information storage portion 64.

The communications portion 61 not only performs communications with the mobile telephone terminal 2 via the mobile telephone line 5, but also performs communications with servers 8, 9, and 10 at a traffic center, a police station, and an insurance company, respectively, via other lines 7 (such as dedicated lines and the Internet).

The information management portion 62 manages the driving condition data (including acquisition, analysis, storage, and transmission thereof) which is transferred from the driving recorder 1 mounted in the vehicle that has caused a traffic accident, traffic accident data (data indicating a location and time at which the traffic accident occurred, and the like) which is generated by analyzing the driving condition data, and accumulated traffic accident data (data indicating a location and time at which traffic accidents most frequently occur, namely a traffic-accident prone location and time) which is generated by analyzing plural sets of the traffic accident data and then accumulating them.

The information analysis portion 63 analyzes the driving condition data transferred from the driving recorder 1 mounted in the vehicle that has caused the traffic accident via the mobile telephone terminal 2, and then generates the aforementioned traffic accident data. Moreover, the information analysis portion 63 analyzes the plural sets of traffic accident data and then accumulates them, and thereby generates the aforementioned accumulated traffic accident data.

The information storage portion 64 stores the driving condition data, the traffic accident data, and the accumulated traffic accident data described above in the non-volatile manner.

Preferably, the server 6 is so formed as to work together with the servers 8, 9, and 10 at the traffic center, the police station, and the insurance company, respectively, whereby the traffic-accident-related information (including the driving condition data, the traffic accident data, and the accumulated traffic accident data) is made available among them. With this construction, it is possible to enhance information concerning traffic accidents (to increase the known number of traffic accidents given as a parameter), and to share performance imposed on a server, among the plurality of servers.

The server 6 constructed as described above transmits, in response to a request from the mobile telephone terminal 2, latest accumulated traffic accident data to the mobile telephone terminal 2. The mobile telephone terminal 2 then transfers a content received from the server 6 onto the driving recorder 1. At that time, if communication between the mobile telephone terminal 2 and the driving recorder 1 is disabled, the content received from the server 6 is temporarily stored in the non-volatile storage portion of the mobile telephone terminal 2, and when the communication with the driving recorder 1 is enabled, the mobile telephone terminal 2 transfers the latest accumulated traffic accident data to the driving recorder 1.

When the driving recorder 1 receives the content from the mobile telephone terminal 2, the control portion 101 updates old accumulated traffic accident data that has been stored in the storage portion 107, and then, based on the latest accumulated traffic accident data, controls the warning portion 110 to thereby alert a driver. For example, when the accumulated traffic accident data includes information concerning a traffic-accident-prone location, the warning portion 110 alerts every driver of the vehicle approaching that traffic-accident prone location. The alert may be given in the form of sound so as to notify a driver that he or she is at the traffic-accident prone location, or may be given using a car navigation system separately mounted in a vehicle so as to show a driver a traffic-accident prone location as a mark (icon, etc.) on a map display.

It is preferable that the accumulated traffic accident data include, other than the information concerning a traffic-accident-prone location, supplementary information such as traffic-accident-prone time and a cause. For example, in a case where a flag indicating “front-to-front collision occurs frequently” is set, it is possible to give a warning in advance to alert a driver so that he or she should thoroughly check safety of the surroundings; in a case where a flag indicating “drift out of lane after turning excessively fast” is set, the warning is given in advance to alert a driver so that he or she should sufficiently lower the speed before entering a curve. Here, since, in order to include such supplementary information, analyzing of the driving condition data from the driving recorders 1 mounted in the vehicles that have caused traffic accidents is not sufficient in many respects, it is preferable, as described above, that the server 6 work together with the serves 8, 9, and 10 at the traffic center, the police station, and the insurance company, respectively, so that information concerning traffic accidents is made available among them.

Thus, with the traffic information system providing a traffic-accident-related information sharing service, in which the server 6 serves as a main part thereof, it is possible to use the driving recorder 1 in a proactive manner as means for preventing a traffic accident; this encourages purchase of the driving recorder, and hence, contributes to promote road safety.

Although the foregoing deals with the construction in which the server 6 transmits the latest accumulated traffic accident data in response to a request from the mobile telephone terminal 2, this is not meant to limit how the present invention is practiced; for example, the latest accumulated traffic accident data may be transmitted regularly (e.g., once a month) from the server 6 to the mobile telephone terminal 2 which is registered in advance as a subscriber of the traffic-accident-related information sharing service. With this arrangement, it is possible to keep the accumulated traffic accident data stored in the driving recorder 1 up to date.

Although the foregoing deals with, by way of example, the construction in which the accumulated traffic accident data is transmitted to the mobile telephone terminal 2, this is not meant to limit how the present invention is practiced; for example, when the driving condition data is transferred from a vehicle that has caused a traffic accident to the server 6, of all the above-described driving condition data, at least the positional information of the traffic accident location may be promptly transmitted to unspecified plural mobile telephone terminals within an area for which the base station nearby the accident location is responsible. With this arrangement, it is possible to inform, approximately in real time, drivers approaching that location of the fact that a traffic accident has occurred ahead of them; accordingly, drivers are encouraged to look for an alternative route and the like, thus making it possible to avoid the occurrence of road congestion or a secondary traffic accident.

Figure 5:
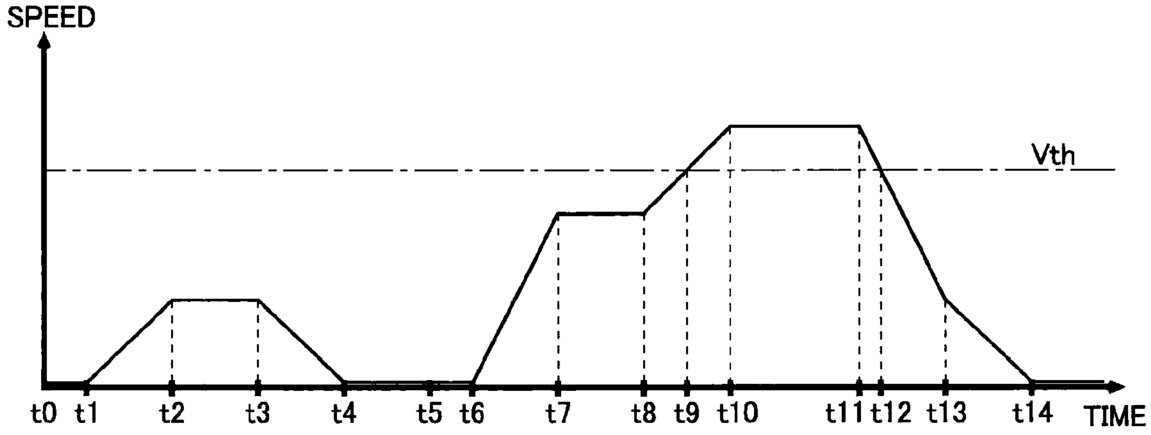
FIG. 5 is a time chart showing an example of a driving condition.

Next, a service for evaluating fuel-efficient driving performance (i.e., fuel-efficient driving performance evaluation service) for which the server 6 plays a main roll will be described in detail with reference to FIGS. 5 and 6. FIG. 5 is a time chart showing an example of a driving condition, where the horizontal axis represents time and the vertical axis represents a speed of a vehicle. FIG. 6 is a data table showing an example of the driving condition data recorded under conditions shown in FIG. 5; specifically, FIG. 6 show parameters necessary for the fuel-efficient driving performance evaluation service (time/date (ti), a vehicle position P(ti), a speed V(ti), acceleration A(ti), and a number of revolutions of an engine, namely rpm R(ti), where i=0 to 14).

Regarding those parameters listed in FIG. 6, regardless of whether the driving recorder 1 is of the "conditional storage design" or the "constant storage design," all of measurement values collected from when the engine starts until when it stops (namely while the driving recorder 1 is being operated) are stored in the non-volatile storage portion 107, with none of them being discarded. On the other hand, regarding the driving condition data necessary for a post-accident analysis, as described above, simply data collected for several seconds to several minutes before and after a traffic accident occurs is stored in the non-volatile storage portion 107, and any data older than it is discarded in order. Thus, of all the driving condition data, measurement values for the parameters necessary for the fuel-efficient driving performance evaluation service need to be retained for a long time (e.g., for 24 hours); however, since those parameters do not include the image data collected by the imaging portion 102, there is no concern that capacity of the storage portion 107 is overwhelmed unnecessarily.

When the engine starts at time t0, the driving recorder 1 starts collecting and storing the driving condition data. A time interval at which the driving condition data is collected may be set to an appropriate value (e.g., every 0.5 seconds) in consideration of balance between analysis accuracy and data capacity. From time t0 to time t1, a vehicle is idling (an idling period). From time t1 to time t2, the vehicle is traveling at an accelerated speed (accelerated traveling period). From time t2 to time t3, the vehicle is traveling at a constant speed (constant speed traveling period). From time t3 to time t4, the vehicle is traveling at a decelerated speed (decelerated traveling period). When the engine stops at time t4, the driving recorder 1 stops collecting and storing the driving condition data.

When the engine restarts at time t5, the driving recorder 1 restarts collecting and storing the driving condition data. From time t5 to time t6, the vehicle is idling (the idling period). From time t6 to time t7, the vehicle is traveling at an accelerated speed. From time t7 to time t8, the vehicle is traveling at a constant speed (the constant speed traveling period). From time t8 to time t10, the vehicle is traveling at an accelerated speed (the accelerated traveling period). From time t10 to time t11, the vehicle is traveling at a constant speed (the constant speed traveling period). From time t11 to time t14, the vehicle is traveling at a decelerated speed (the decelerated traveling period). When the engine stops at time t14, the driving recorder 1 stops collecting and storing the driving condition data.

After that, when a driver performs operation for transferring the driving condition data, using the mobile telephone terminal 2, the driving condition data stored in the storage portion 107 is transferred to the server 6 via the mobile telephone terminal 2. The server 6 then analyzes the driving condition data received from the mobile telephone terminal 2 and, after evaluating the driving performance of that driver from the viewpoint of increasing fuel-consumption efficiency, sends back a result of the evaluation to the mobile telephone terminal 2. The result of the evaluation may be included in an e-mail message, or may be reported through an URL (uniform resource locator) indicating a location of the result.

Next, how to evaluate the driving performance from the viewpoint of increasing fuel consumption efficiency will be described in more detail. Examples of a driver's action leading to unnecessary fuel consumption include excessive speeding, sudden acceleration, sudden deceleration, and excessive engine rpm increasing (including warming up in idling) (hereinafter, collectively referred to as "inefficient driving"). Thus, the server 6 calculates a ratio of time for which the ineffective driving operation as described above is performed to a traveling time in one round (in FIGS. 5 and 6, total time of time t0 to time t4, and time t5 to time t14), so that, based on that result, the driver is enlightened or receives an advise on how to achieve better fuel-efficient driving performance.

That is, the server 6, when evaluating the fuel-efficient driving performance, checks whether or not the speed V(ti) exceeds a predetermined upper limit Vth, whether or not the acceleration A(ti) exceeds a predetermined upper limit Ath+, whether or not the acceleration A(ti) falls below a predetermined lower limit Ath−, and whether or not the number of revolutions of an engine, namely rpm R(ti) exceeds a predetermined upper limit Rth and, if at least one condition is satisfied, determines that the ineffective driving was performed at time ti.

This will be described in more detail along with the driving condition shown, by way of example, in FIGS. 5 and 6. For the sake of simplicity, in the following explanation, the engine rpm R(ti) is considered as irrelevant, and the driving performance is evaluated from the viewpoint of increasing fuel-consumption efficiency, based on the speed V(ti) and the acceleration A(ti).

Regarding the excessive speeding, speeds V(t9) to V(t12) are determined to exceed the predetermined upper limit Vth, and a period between times t9 and t12 is counted as the ineffective driving period (excessive speeding period). Moreover, regarding the sudden acceleration, accelerations A(t6) to A(t7) are determined to exceed the predetermined upper limit Ath+, and a period between times t6 and t7 is counted as the ineffective driving period (sudden acceleration period). Moreover, regarding the sudden deceleration, accelerations A(t11) to A(t13) are determined to fall below the lower limit Ath−, and a period between times t1 and t13 is counted as the ineffective driving period (sudden deceleration period). However, a period between times t11 and t12 corresponds to the excessive speeding period and the sudden deceleration period; thus, no double counting is carried out.

After the above-described evaluation processing is completed, the server 6 generates data of a result thereof to be reported to a driver. The result of the evaluation may be reported on a scale indicating how much the fuel-efficient driving performance was achieved based on the ratio of the ineffective driving to the one round of traveling, or may be indicated in the form of a breakdown of the driving performance (e.g., fuel-efficient driving period A %, idling period B %, and ineffective driving period C % (excessive speeding period a %, sudden acceleration period b %, and sudden deceleration period c %)). Moreover, it is effective to point out, of all the driver's actions carried out during the traveling, which one leaded to the worst fuel consumption (e.g., excessive speeding), and to given that driver an advice to improve it. As a matter of fact, as means for reporting to the driver the result of the evaluation of his or her fuel-efficient driving performance, which is received from the server 6, a display portion (such as a liquid crystal display panel and the like) may be used.

Thus, with the traffic accident information system providing the fuel-efficient driving performance evaluation service, in which the server 6 plays a main role, it is possible to use the driving recorder 1 in a proactive manner as means for assisting a driver to learn, carry out, and continue better fuel-efficient driving actions; this encourages purchase of the driving recorder, and hence, greatly contributes to promote environmental care.

Moreover, when a detailed analysis of the driving condition data is not performed by the driving recorder 1 but by the server 6, there is no need to excessively enhance information processing performance of the driving recorder 1; this helps reduce an increase in the size and cost of a resulting apparatus.

The server 6 may be formed such that results of the evaluations for better fuel-efficient driving performance are accumulated therein. With this construction, it is possible to compare, for each round of traveling, fuel-efficient driving performance achieved in one round with that achieved in a preceding round, or it is possible to obtain an average value of the fuel-efficient driving performances obtained over a predetermined period of time, to thereby perform a longer-term analysis; this makes it possible to report how relevant driver's fuel-efficient driving techniques are changing, and to thereby enhance motivation of the driver.

In the example shown in FIGS. 5 and 6, both period between times t0 and t1 and period between times t5 and t6 correspond to the idling period, during which the speed V(ti) and the acceleration A(ti) are both zero, and when the above-described evaluation criteria apply, these periods are not counted as the ineffective driving period. However, such an excessively long idling period leads to unnecessary fuel consumption; thus, an algorithm necessary for evaluating the driving performance from the viewpoint of increasing fuel-consumption efficiency is appropriately changed so that such a long idling period is determined to be the ineffective driving.

For the sake of simplicity, with the engine rpm R(ti) being irrelevant, the foregoing does not specifically mentions the other evaluation criteria; however, in order to perform more detailed evaluation on fuel consumption efficiency, it is preferable, for example, that another evaluation criterion, namely whether or not a fluctuation (repeated acceleration and deceleration) occurs to the speed V(ti) be added.

Moreover, it is preferable that the upper limit Vth of the speed V(ti), the upper limit Ath+ and lower limit Ath− of the acceleration A(ti), and the upper limit Rth of the rtm R(ti) be appropriately adjusted in consideration of traveling conditions such as a difference between traveling on a flat and a sloping road, or a difference between traveling on a freeway and a local street. In order to adjust those threshold values, the driving condition data transferred from the driving recorder 1 to the server 6 needs to include information regarding a position P(ti) of a relevant vehicle.

Although the foregoing deals with the arrangement in which, of all the driving condition data collected by the driving recorder 1, those parameters necessary for evaluating the fuel-efficient driving performance, namely the time/date (ti), vehicle position P(ti), speed V(ti), acceleration A(ti), and engine rpm R(ti) are selected and continuously measured, and values thus obtained are stored for the period between times to and t4, and for the period between times t5 and t14, and then from the driving recorder 1, the whole content of the storage is transferred to the server 6, this is not meant to limit how the present invention is practiced; when reduced capacity of the storage portion 107 and reduced communication data of the mobile telephone terminal 2 (and hence reduced communications cost) are prioritized, those parameters mentioned above may be so arranged as to be stored in the storage portion 107 only when the engine starts and stops, and while the ineffective driving is performed as indicated by the hatched areas in FIG. 6, so that the content of the storage portion 107 is transferred to the server 6. In a case where such an arrangement as described above is employed, the driving recorder 1 needs to perform evaluation of the ineffective driving (evaluations of the excessive speeding, sudden acceleration, sudden deceleration, excessive engine rpm, and the like); however, this is satisfactorily accomplished by comparing each parameter with the corresponding predetermined threshold value, thus eliminating the need to unnecessarily enhance the information processing performance of the driving recorder 1.

From the perspective of industrial applicability, the present invention is useful in improving user-friendliness of the driving recorders.

Apart from the embodiment specifically described above, various changes can be made in practicing the present invention without departing from the scope of the spirit of the invention.

That is, although the foregoing deals with the best mode of the present invention, it is obvious for a person with skill in the art that the invention disclosed herein can be practiced in various ways and in various embodiments other than the constructions and arrangements specifically described above. Therefore, the appended claims are intended to encompass any modified examples in the technical scope of the present invention without departing from the spirit and scope of the invention.

What is claimed is:

1. A driving recorder comprising:

a data collecting portion arranged to continuously collect driving condition data of a vehicle;

a storage portion arranged to store the driving condition data in a non-volatile manner;

a communications portion arranged to perform mutual communications with a mobile telephone terminal, using a cable or wirelessly;

a control portion arranged to comprehensively control the data collecting portion, the storage portion, and the communications portion; and an acceleration sensor arranged to detect acceleration of the vehicle, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the storage portion to thereby permit the storage portion to store the driving condition data, and simultaneously controls the communications portion to thereby permit the communications portion to transmit the driving condition data to the mobile telephone terminal, and wherein the control portion is arranged to determine that the trigger condition is satisfied when the acceleration generated by the vehicle exceeds a predetermined threshold value.

2. The driving recorder according to claim 1, wherein the driving condition data includes image data of an area surrounding the vehicle or an interior of the vehicle.

3. The driving recorder according to claim 1, further comprising:

a warning portion arranged to provide a sound, an image, or a combination thereof, wherein the control portion is arranged to control the warning portion, based on traffic accident data or accumulated traffic accident data transferred from the mobile telephone terminal, to thereby permit the warning portion to alert a driver of the vehicle.

4. A driving recorder comprising:

a data collecting portion arranged to continuously collect driving condition data of a vehicle;

a storage portion arranged to store the driving condition data in a non-volatile manner;

a communications portion arranged to perform mutual communications with a mobile telephone terminal, using a cable or wirelessly;

a control portion arranged to comprehensively control the data collecting portion, the storage portion, and the communications portion; and an operation portion arranged to receive user operation, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the storage portion to thereby permit the storage portion to store the driving condition data, and simultaneously controls the communications portion to thereby permit the communications portion to transmit the driving condition data to the mobile telephone terminal, and wherein the control portion is arranged such that, in response to receiving predetermined user operation, the control portion determines that the trigger condition is satisfied.

5. The driving recorder according to claim 4, wherein the driving condition data includes image data of an area surrounding the vehicle or an interior of the vehicle.

6. The driving recorder according to claim 4, further comprising:

a warning portion arranged to provide a sound, an image, or a combination thereof, wherein the control portion is arranged to control the warning portion, based on traffic accident data or accumulated traffic accident data transferred from the mobile telephone terminal, to thereby permit the warning portion to alert a driver of the vehicle.

7. A driving recorder comprising:

a data collecting portion arranged to continuously collect driving condition data of a vehicle;

a storage portion arranged to store the driving condition data in a non-volatile manner;

a communications portion arranged to perform mutual communications with a mobile telephone terminal, using a cable or wirelessly; and a control portion arranged to comprehensively control the data collecting portion, the storage portion, and the communications portion;

wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the storage portion to thereby permit the storage portion to store the driving condition data, and simultaneously controls the communications portion to thereby permit the communications portion to transmit the driving condition data to the mobile telephone terminal, and wherein the control portion is arranged such that, in response to receiving a request from the mobile telephone terminal via the communications portion, the control portion determines that the trigger condition is satisfied.

8. The driving recorder according to claim 7, wherein the driving condition data includes image data of an area surrounding the vehicle or an interior of the vehicle.

9. The driving recorder according to claim 7, further comprising:

a warning portion arranged to provide a sound, an image, or a combination thereof, wherein the control portion is arranged to control the warning portion, based on traffic accident data or accumulated traffic accident data transferred from the mobile telephone terminal, to thereby permit the warning portion to alert a driver of the vehicle.

10. A mobile telephone terminal comprising:

a transfer functional part arranged such that, in response to receiving driving condition data from a driving recorder, the transfer functional part transfers the driving condition data to a predetermined server via a mobile telephone line, the driving recorder comprising:

a data collecting portion arranged to continuously collect the driving condition data of a vehicle;

a storage portion arranged to store the driving condition data in a non-volatile manner;

a communications portion arranged to perform mutual communications with the mobile telephone terminal, using a cable or wirelessly;

a control portion arranged to comprehensively control the data collecting portion, the storage portion, and the communications portion; and an acceleration sensor arranged to detect acceleration of the vehicle, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the storage portion to thereby permit the storage portion to store the driving condition data, and simultaneously controls the communications portion to thereby permit the communications portion to transmit the driving condition data to the mobile telephone terminal, and wherein the control portion is arranged to determine that the trigger condition is satisfied when the acceleration generated by the vehicle exceeds a predetermined threshold value.

11. The mobile telephone terminal according to claim 10, further comprising:

a transmission request functional part arranged to send, to the driving recorder, a request for transmitting the driving condition data, in accordance with predetermined user operation or a request from the server.

12. The mobile telephone terminal according to claim 10, wherein the transfer functional part is arranged to transfer, to the driving recorder, traffic accident data or accumulated traffic accident data transmitted from the server.

13. An apparatus comprising a mobile telephone terminal comprising an arithmetic processing portion for executing a program for the mobile telephone terminal;

wherein execution of the program enables the arithmetic processing portion to function as a transfer functional part that, in response to receiving driving condition data from a driving recorder, transfers the driving condition data to a predetermined server via a mobile telephone line, wherein the driving recorder comprises:

a data collecting portion arranged to continuously collect the driving condition data of a vehicle;

a storage portion arranged to store the driving condition data in a non-volatile manner;

a communications portion arranged to perform mutual communications with the mobile telephone terminal using a cable or wirelessly;

a control portion arranged to comprehensively control the data collecting portion, the storage portion, and the communications portion; and an acceleration sensor arranged to detect acceleration of the vehicle, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the storage portion to thereby permit the storage portion to store the driving condition data, and simultaneously controls the communications portion to thereby permit the communications portion to transmit the driving condition data to the mobile telephone terminal, and wherein the control portion is arranged to determine that the trigger condition is satisfied when the acceleration generated by the vehicle exceeds a predetermined threshold value.

14. A server comprising:

a communications functional part arranged to communicate with a mobile telephone terminal via a mobile telephone line;

wherein the mobile telephone terminal comprises:

a transfer functional part arranged such that, in response to receiving driving condition data from a driving recorder, the transfer functional part transfers the driving condition data to the server via the mobile telephone line, wherein the driving recorder comprises:

a data collecting portion arranged to continuously collect the driving condition data of a vehicle;

a storage portion arranged to store the driving condition data in a non-volatile manner;

a communications portion arranged to perform mutual communications with the mobile telephone terminal, using a cable or wirelessly;

a control portion arranged to comprehensively control the data collecting portion, the storage portion, and the communications portion; and an acceleration sensor arranged to detect acceleration of the vehicle, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the storage portion to thereby permit the storage portion to store the driving condition data, and simultaneously controls the communications portion to thereby permit the communications portion to transmit the driving condition data to the mobile telephone terminal, and wherein the control portion is arranged to determine that the trigger condition is satisfied when the acceleration generated by the vehicle exceeds a predetermined threshold value.

15. The server according to claim 14, wherein the server is arranged to analyze the driving condition data transferred from the mobile telephone terminal, and then generate traffic accident data.

16. The server according to claim 15, wherein the server is arranged to analyze and accumulate a plurality of sets of the traffic accident data, and thereby generate accumulated traffic accident data.

17. A traffic information system comprising:

a driving recorder;

a mobile telephone terminal; and a server, wherein the driving recorder comprises:

a data collecting portion arranged to continuously collect driving condition data of a vehicle;

a storage portion arranged to store the driving condition data in a non-volatile manner;

a communications portion arranged to perform mutual communications with the mobile telephone terminal, using a cable or wirelessly;

a control portion arranged to comprehensively control the data collecting portion, the storage portion, and the communications portion; and an acceleration sensor arranged to detect acceleration of the vehicle, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the storage portion to thereby permit the storage portion to store the driving condition data, and simultaneously controls the communications portion to thereby permit the communications portion to transmit the driving condition data to the mobile telephone terminal, and wherein the control portion is arranged to determine that the trigger condition is satisfied when the acceleration generated by the vehicle exceeds a predetermined threshold value, wherein the mobile telephone terminal comprises:

a transfer functional part arranged such that, in response to receiving the driving condition data from the driving recorder, the transfer functional part transfers the driving condition data to the server via a mobile telephone line, wherein the server comprises:

a communications functional part arranged to communicate with the mobile telephone terminal via the mobile telephone line.

18. A mobile telephone terminal comprising:

a transfer functional part arranged such that, in response to receiving driving condition data from a driving recorder, the transfer functional part transfers the driving condition data to a predetermined server via a mobile telephone line, the driving recorder comprising:

a data collecting portion arranged to continuously collect the driving condition data of a vehicle;

a storage portion arranged to store the driving condition data in a non-volatile manner;

a communications portion arranged to perform mutual communications with the mobile telephone terminal, using a cable or wirelessly;

a control portion arranged to comprehensively control the data collecting portion, the storage portion, and the communications portion; and an operation portion arranged to receive user operation, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the storage portion to thereby permit the storage portion to store the driving condition data, and simultaneously controls the communications portion to thereby permit the communications portion to transmit the driving condition data to the mobile telephone terminal, and wherein the control portion is arranged such that, in response to receiving predetermined user operation, the control portion determines that the trigger condition is satisfied.

19. The mobile telephone terminal according to claim 18, further comprising:

a transmission request functional part arranged to send, to the driving recorder, a request for transmitting the driving condition data, in accordance with predetermined user operation or a request from the server.

20. The mobile telephone terminal according to claim 18, wherein the transfer functional part is arranged to transfer, to the driving recorder, traffic accident data or accumulated traffic accident data transmitted from the server.

21. An apparatus comprising a mobile telephone terminal comprising an arithmetic processing portion for executing a program for the mobile telephone terminal;

wherein execution of the program enables the arithmetic processing portion to function as a transfer functional part that, in response to receiving driving condition data from a driving recorder, transfers the driving condition data to a predetermined server via a mobile telephone line, wherein the driving recorder comprises:

a data collecting portion arranged to continuously collect the driving condition data of a vehicle;

a storage portion arranged to store the driving condition data in a non-volatile manner;

a communications portion arranged to perform mutual communications with the mobile telephone terminal using a cable or wirelessly;

a control portion arranged to comprehensively control the data collecting portion, the storage portion, and the communications portion; and an operation portion arranged to receive user operation, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the storage portion to thereby permit the storage portion to store the driving condition data, and simultaneously controls the communications portion to thereby permit the communications portion to transmit the driving condition data to the mobile telephone terminal, and wherein the control portion is arranged such that, in response to receiving predetermined user operation, the control portion determines that the trigger condition is satisfied.

22. A server comprising:

a communications functional part arranged to communicate with a mobile telephone terminal via a mobile telephone line;

wherein the mobile telephone terminal comprises:

a transfer functional part arranged such that, in response to receiving driving condition data from a driving recorder, the transfer functional part transfers the driving condition data to the server via the mobile telephone line, wherein the driving recorder comprises:

a data collecting portion arranged to continuously collect the driving condition data of a vehicle;

a storage portion arranged to store the driving condition data in a non-volatile manner;

a communications portion arranged to perform mutual communications with the mobile telephone terminal, using a cable or wirelessly;

a control portion arranged to comprehensively control the data collecting portion, the storage portion, and the communications portion; and an operation portion arranged to receive user operation, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the storage portion to thereby permit the storage portion to store the driving condition data, and simultaneously controls the communications portion to thereby permit the communications portion to transmit the driving condition data to the mobile telephone terminal, and wherein the control portion is arranged such that, in response to receiving predetermined user operation, the control portion determines that the trigger condition is satisfied.

23. The server according to claim 22, wherein the server is arranged to analyze the driving condition data transferred from the mobile telephone terminal, and then generate traffic accident data.

24. The server according to claim 22, wherein the server is arranged to analyze and accumulate a plurality of sets of the traffic accident data, and thereby generate accumulated traffic accident data.

25. A traffic information system comprising:

a driving recorder;

a mobile telephone terminal; and a server, wherein the driving recorder comprises:

a data collecting portion arranged to continuously collect driving condition data of a vehicle;

a storage portion arranged to store the driving condition data in a non-volatile manner;

a communications portion arranged to perform mutual communications with the mobile telephone terminal, using a cable or wirelessly;

a control portion arranged to comprehensively control the data collecting portion, the storage portion, and the communications portion; and an operation portion arranged to receive user operation, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the storage portion to thereby permit the storage portion to store the driving condition data, and simultaneously controls the communications portion to thereby permit the communications portion to transmit the driving condition data to the mobile telephone terminal, and wherein the control portion is arranged such that, in response to receiving predetermined user operation, the control portion determines that the trigger condition is satisfied wherein the mobile telephone terminal comprises:

a transfer functional part arranged such that, in response to receiving the driving condition data from the driving recorder, the transfer functional part transfers the driving condition data to the server via a mobile telephone line, wherein the server comprises:

a communications functional part arranged to communicate with the mobile telephone terminal via the mobile telephone line.

26. A mobile telephone terminal comprising:

a transfer functional part arranged such that, in response to receiving driving condition data from a driving recorder, the transfer functional part transfers the driving condition data to a predetermined server via a mobile telephone line, the driving recorder comprising:

a data collecting portion arranged to continuously collect the driving condition data of a vehicle;

a storage portion arranged to store the driving condition data in a non-volatile manner;

a communications portion arranged to perform mutual communications with the mobile telephone terminal, using a cable or wirelessly; and a control portion arranged to comprehensively control the data collecting portion, the storage portion, and the communications portion, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the storage portion to thereby permit the storage portion to store the driving condition data, and simultaneously controls the communications portion to thereby permit the communications portion to transmit the driving condition data to the mobile telephone terminal, and wherein the control portion is arranged such that, in response to receiving a request from the mobile telephone terminal via the communications portion, the control portion determines that the trigger condition is satisfied.

27. The mobile telephone terminal according to claim 26, further comprising:

a transmission request functional part arranged to send, to the driving recorder, a request for transmitting the driving condition data, in accordance with predetermined user operation or a request from the server.

28. The mobile telephone terminal according to claim 26, wherein the transfer functional part is arranged to transfer, to the driving recorder, traffic accident data or accumulated traffic accident data transmitted from the server.

29. An apparatus comprising a mobile telephone terminal comprising an arithmetic processing portion for executing a program for the mobile telephone terminal;

wherein execution of the program enables the arithmetic processing portion to function as a transfer functional part that, in response to receiving driving condition data from a driving recorder, transfers the driving condition data to a predetermined server via a mobile telephone line, wherein the driving recorder comprises:

a data collecting portion arranged to continuously collect the driving condition data of a vehicle;

a storage portion arranged to store the driving condition data in a non-volatile manner;

a communications portion arranged to perform mutual communications with the mobile telephone terminal using a cable or wirelessly; and a control portion arranged to comprehensively control the data collecting portion, the storage portion, and the communications portion, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the storage portion to thereby permit the storage portion to store the driving condition data, and simultaneously controls the communications portion to thereby permit the communications portion to transmit the driving condition data to the mobile telephone terminal, and wherein the control portion is arranged such that, in response to receiving a request from the mobile telephone terminal via the communications portion, the control portion determines that the trigger condition is satisfied.

30. A server comprising:

a communications functional part arranged to communicate with a mobile telephone terminal via a mobile telephone line;

wherein the mobile telephone terminal comprises:

a transfer functional part arranged such that, in response to receiving driving condition data from a driving recorder, the transfer functional part transfers the driving condition data to the server via the mobile telephone line, wherein the driving recorder comprises:

a data collecting portion arranged to continuously collect the driving condition data of a vehicle;

a storage portion arranged to store the driving condition data in a non-volatile manner;

a communications portion arranged to perform mutual communications with the mobile telephone terminal, using a cable or wirelessly; and a control portion arranged to comprehensively control the data collecting portion, the storage portion, and the communications portion, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the storage portion to thereby permit the storage portion to store the driving condition data, and simultaneously controls the communications portion to thereby permit the communications portion to transmit the driving condition data to the mobile telephone terminal, and wherein the control portion is arranged such that, in response to receiving a request from the mobile telephone terminal via the communications portion, the control portion determines that the trigger condition is satisfied.

31. The server according to claim 30, wherein the server is arranged to analyze the driving condition data transferred from the mobile telephone terminal, and then generate traffic accident data.

32. The server according to claim 30, wherein the server is arranged to analyze and accumulate a plurality of sets of the traffic accident data, and thereby generate accumulated traffic accident data.

33. A traffic information system comprising:

a driving recorder;

a mobile telephone terminal; and a server, wherein the driving recorder comprises:

a data collecting portion arranged to continuously collect driving condition data of a vehicle;

a storage portion arranged to store the driving condition data in a non-volatile manner;

a communications portion arranged to perform mutual communications with the mobile telephone terminal, using a cable or wirelessly; and a control portion arranged to comprehensively control the data collecting portion, the storage portion, and the communications portion;

wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the storage portion to thereby permit the storage portion to store the driving condition data, and simultaneously controls the communications portion to thereby permit the communications portion to transmit the driving condition data to the mobile telephone terminal, and wherein the control portion is arranged such that, in response to receiving a request from the mobile telephone terminal via the communications portion, the control portion determines that the trigger condition is satisfied, wherein the mobile telephone terminal comprises:

a transfer functional part arranged such that, in response to receiving the driving condition data from the driving recorder, the transfer functional part transfers the driving condition data to the server via a mobile telephone line, wherein the server comprises:

a communications functional part arranged to communicate with the mobile telephone terminal via the mobile telephone line.

34. A driving recorder comprising:

a data collecting portion arranged to continuously collect driving condition data of a vehicle;

a storage portion arranged to store the driving condition data in a non-volatile manner;

a communications portion arranged to perform mutual communications with a mobile telephone terminal, using a cable or wirelessly;

a control portion arranged to comprehensively control the data collecting portion, the storage portion, and the communications portion; and an acceleration sensor arranged to detect acceleration of the vehicle, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the communications portion to thereby permit the communications portion to transmit the driving condition data to the mobile telephone terminal, and that, regardless of whether or not the predetermined trigger condition is satisfied, the control portion controls the storage portion to thereby permit the storage portion to continuously store the driving condition data without interruption, and wherein the control portion is arranged to determine that the trigger condition is satisfied when the acceleration generated by the vehicle exceeds a predetermined threshold value.

35. The driving recorder according to claim 34, wherein the driving condition data includes image data of an area surrounding the vehicle or an interior of the vehicle.

36. The driving recorder according to claim 34, further comprising:

a warning portion arranged to provide a sound, an image, or a combination thereof, wherein the control portion is arranged to control the warning portion, based on traffic accident data or accumulated traffic accident data transferred from the mobile telephone terminal, to thereby permit the warning portion to alert a driver of the vehicle.

37. A mobile telephone terminal comprising:

a transfer functional part arranged such that, in response to receiving driving condition data from a driving recorder, the transfer functional part transfers the driving condition data to a predetermined server via a mobile telephone line, the driving recorder comprising:

a data collecting portion arranged to continuously collect the driving condition data of a vehicle;

a storage portion arranged to store the driving condition data in a non-volatile manner;

a communications portion arranged to perform mutual communications with the mobile telephone terminal, using a cable or wirelessly;

a control portion arranged to comprehensively control the data collecting portion, the storage portion, and the communications portion; and an acceleration sensor arranged to detect acceleration of the vehicle, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the communications portion to thereby permit the communications portion to transmit the driving condition data to the mobile telephone terminal, and that, regardless of whether or not the predetermined trigger condition is satisfied, the control portion controls the storage portion to thereby permit the storage portion to continuously store the driving condition data without interruption, and wherein the control portion is arranged to determine that the trigger condition is satisfied when the acceleration generated by the vehicle exceeds a predetermined threshold value.

38. The mobile telephone terminal according to claim 37, further comprising:

a transmission request functional part arranged to send, to the driving recorder, a request for transmitting the driving condition data, in accordance with predetermined user operation or a request from the server.

39. The mobile telephone terminal according to claim 37, wherein the transfer functional part is arranged to transfer, to the driving recorder, traffic accident data or accumulated traffic accident data transmitted from the server.

40. An apparatus comprising a mobile telephone terminal comprising an arithmetic processing portion for executing a program for the mobile telephone terminal;

wherein execution of the program enables the arithmetic processing portion to function as a transfer functional part that, in response to receiving driving condition data from a driving recorder, transfers the driving condition data to a predetermined server via a mobile telephone line, wherein the driving recorder comprises:

a data collecting portion arranged to continuously collect the driving condition data of a vehicle;

a storage portion arranged to store the driving condition data in a non-volatile manner;

a communications portion arranged to perform mutual communications with the mobile telephone terminal using a cable or wirelessly;

a control portion arranged to comprehensively control the data collecting portion, the storage portion, and the communications portion; and an acceleration sensor arranged to detect acceleration of the vehicle, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the communications portion to thereby permit the communications portion to transmit the driving condition data to the mobile telephone terminal, and that, regardless of whether or not the predetermined trigger condition is satisfied, the control portion controls the storage portion to thereby permit the storage portion to continuously store the driving condition data without interruption, and wherein the control portion is arranged to determine that the trigger condition is satisfied when the acceleration generated by the vehicle exceeds a predetermined threshold value.

41. A server comprising:

a communications functional part arranged to communicate with a mobile telephone terminal via a mobile telephone line;

wherein the mobile telephone terminal comprises:

a transfer functional part arranged such that, in response to receiving driving condition data from a driving recorder, the transfer functional part transfers the driving condition data to the server via the mobile telephone line, wherein the driving recorder comprises:

a data collecting portion arranged to continuously collect the driving condition data of a vehicle;

a storage portion arranged to store the driving condition data in a non-volatile manner;

a communications portion arranged to perform mutual communications with the mobile telephone terminal, using a cable or wirelessly;

a control portion arranged to comprehensively control the data collecting portion, the storage portion, and the communications portion; and an acceleration sensor arranged to detect acceleration of the vehicle, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the communications portion to thereby permit the communications portion to transmit the driving condition data to the mobile telephone terminal, and that, regardless of whether or not the predetermined trigger condition is satisfied, the control portion controls the storage portion to thereby permit the storage portion to continuously store the driving condition data without interruption, and wherein the control portion is arranged to determine that the trigger condition is satisfied when the acceleration generated by the vehicle exceeds a predetermined threshold value.

42. The server according to claim 41, wherein the server is arranged to analyze the driving condition data transferred from the mobile telephone terminal, and then generate traffic accident data.

43. The server according to claim 41, wherein the server is arranged to analyze and accumulate a plurality of sets of the traffic accident data, and thereby generate accumulated traffic accident data.

44. A traffic information system comprising:

a driving recorder;

a mobile telephone terminal; and a server, wherein the driving recorder comprises:

a data collecting portion arranged to continuously collect driving condition data of a vehicle;

a storage portion arranged to store the driving condition data in a non-volatile manner;

a communications portion arranged to perform mutual communications with the mobile telephone terminal, using a cable or wirelessly;

a control portion arranged to comprehensively control the data collecting portion, the storage portion, and the communications portion; and an acceleration sensor arranged to detect acceleration of the vehicle, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the communications portion to thereby permit the communications portion to transmit the driving condition data to the mobile telephone terminal, and that, regardless of whether or not the predetermined trigger condition is satisfied, the control portion controls the storage portion to thereby permit the storage portion to continuously store the driving condition data without interruption, and wherein the control portion is arranged to determine that the trigger condition is satisfied when the acceleration generated by the vehicle exceeds a predetermined threshold value, wherein the mobile telephone terminal comprises:

a transfer functional part arranged such that, in response to receiving the driving condition data from the driving recorder, the transfer functional part transfers the driving condition data to the server via a mobile telephone line, wherein the server comprises:

a communications functional part arranged to communicate with the mobile telephone terminal via the mobile telephone line.

45. A driving recorder comprising:

a data collecting portion arranged to continuously collect driving condition data of a vehicle;

a storage portion arranged to store the driving condition data in a non-volatile manner;

a communications portion arranged to perform mutual communications with a mobile telephone terminal, using a cable or wirelessly;

a control portion arranged to comprehensively control the data collecting portion, the storage portion, and the communications portion; and an operation portion arranged to receive user operation, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the communications portion to thereby permit the communications portion to transmit the driving condition data to the mobile telephone terminal, and that, regardless of whether or not the predetermined trigger condition is satisfied, the control portion controls the storage portion to thereby permit the storage portion to continuously store the driving condition data without interruption, and wherein the control portion is arranged such that, in response to receiving predetermined user operation, the control portion determines that the trigger condition is satisfied.

46. The driving recorder according to claim 45, wherein the driving condition data includes image data of an area surrounding the vehicle or an interior of the vehicle.

47. The driving recorder according to claim 45, further comprising:

a warning portion arranged to provide a sound, an image, or a combination thereof, wherein the control portion is arranged to control the warning portion, based on traffic accident data or accumulated traffic accident data transferred from the mobile telephone terminal, to thereby permit the warning portion to alert a driver of the vehicle.

48. A mobile telephone terminal comprising:

a transfer functional part arranged such that, in response to receiving driving condition data from a driving recorder, the transfer functional part transfers the driving condition data to a predetermined server via a mobile telephone line, the driving recorder comprising:

a data collecting portion arranged to continuously collect the driving condition data of a vehicle;

a storage portion arranged to store the driving condition data in a non-volatile manner;

a communications portion arranged to perform mutual communications with the mobile telephone terminal, using a cable or wirelessly;

a control portion arranged to comprehensively control the data collecting portion, the storage portion, and the communications portion; and an operation portion arranged to receive user operation, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the communications portion to thereby permit the communications portion to transmit the driving condition data to the mobile telephone terminal, and that, regardless of whether or not the predetermined trigger condition is satisfied, the control portion controls the storage portion to thereby permit the storage portion to continuously store the driving condition data without interruption, and wherein the control portion is arranged such that, in response to receiving predetermined user operation, the control portion determines that the trigger condition is satisfied.

49. The mobile telephone terminal according to claim 48, further comprising:

a transmission request functional part arranged to send, to the driving recorder, a request for transmitting the driving condition data, in accordance with predetermined user operation or a request from the server.

50. The mobile telephone terminal according to claim 48, wherein the transfer functional part is arranged to transfer, to the driving recorder, traffic accident data or accumulated traffic accident data transmitted from the server.

51. An apparatus comprising a mobile telephone terminal comprising an arithmetic processing portion for executing a program for the mobile telephone terminal;

wherein execution of the program enables the arithmetic processing portion to function as a transfer functional part that, in response to receiving driving condition data from a driving recorder, transfers the driving condition data to a predetermined server via a mobile telephone line, wherein the driving recorder comprises:

a data collecting portion arranged to continuously collect the driving condition data of a vehicle;

a storage portion arranged to store the driving condition data in a non-volatile manner;

a communications portion arranged to perform mutual communications with the mobile telephone terminal using a cable or wirelessly;

a control portion arranged to comprehensively control the data collecting portion, the storage portion, and the communications portion; and an operation portion arranged to receive user operation, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the communications portion to thereby permit the communications portion to transmit the driving condition data to the mobile telephone terminal, and that, regardless of whether or not the predetermined trigger condition is satisfied, the control portion controls the storage portion to thereby permit the storage portion to continuously store the driving condition data without interruption, and wherein the control portion is arranged such that, in response to receiving predetermined user operation, the control portion determines that the trigger condition is satisfied.

52. A server comprising:

a communications functional part arranged to communicate with a mobile telephone terminal via a mobile telephone line;

wherein the mobile telephone terminal comprises:

a transfer functional part arranged such that, in response to receiving driving condition data from a driving recorder, the transfer functional part transfers the driving condition data to the server via the mobile telephone line, wherein the driving recorder comprises:

a data collecting portion arranged to continuously collect the driving condition data of a vehicle;

a storage portion arranged to store the driving condition data in a non-volatile manner;

a communications portion arranged to perform mutual communications with the mobile telephone terminal, using a cable or wirelessly;

a control portion arranged to comprehensively control the data collecting portion, the storage portion, and the communications portion; and an operation portion arranged to receive user operation, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the communications portion to thereby permit the communications portion to transmit the driving condition data to the mobile telephone terminal, and that, regardless of whether or not the predetermined trigger condition is satisfied, the control portion controls the storage portion to thereby permit the storage portion to continuously store the driving condition data without interruption, and wherein the control portion is arranged such that, in response to receiving predetermined user operation, the control portion determines that the trigger condition is satisfied.

53. The server according to claim 52, wherein the server is arranged to analyze the driving condition data transferred from the mobile telephone terminal, and then generate traffic accident data.

54. The server according to claim 52, wherein the server is arranged to analyze and accumulate a plurality of sets of the traffic accident data, and thereby generate accumulated traffic accident data.

55. A traffic information system comprising:

a driving recorder;

a mobile telephone terminal; and a server, wherein the driving recorder comprises:

a data collecting portion arranged to continuously collect driving condition data of a vehicle;

a storage portion arranged to store the driving condition data in a non-volatile manner;

a communications portion arranged to perform mutual communications with the mobile telephone terminal, using a cable or wirelessly;

a control portion arranged to comprehensively control the data collecting portion, the storage portion, and the communications portion; and an operation portion arranged to receive user operation, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the communications portion to thereby permit the communications portion to transmit the driving condition data to the mobile telephone terminal, and that, regardless of whether or not the predetermined trigger condition is satisfied, the control portion controls the storage portion to thereby permit the storage portion to continuously store the driving condition data without interruption, and wherein the control portion is arranged such that, in response to receiving predetermined user operation, the control portion determines that the trigger condition is satisfied, wherein the mobile telephone terminal comprises:

a transfer functional part arranged such that, in response to receiving the driving condition data from the driving recorder, the transfer functional part transfers the driving condition data to the server via a mobile telephone line, wherein the server comprises:

a communications functional part arranged to communicate with the mobile telephone terminal via the mobile telephone line.

56. A driving recorder comprising:

a data collecting portion arranged to continuously collect driving condition data of a vehicle;

a storage portion arranged to store the driving condition data in a non-volatile manner;

a communications portion arranged to perform mutual communications with a mobile telephone terminal, using a cable or wirelessly; and a control portion arranged to comprehensively control the data collecting portion, the storage portion, and the communications portion, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the communications portion to thereby permit the communications portion to transmit the driving condition data to the mobile telephone terminal, and that, regardless of whether or not the predetermined trigger condition is satisfied, the control portion controls the storage portion to thereby permit the storage portion to continuously store the driving condition data without interruption, and wherein the control portion is arranged such that, in response to receiving a request from the mobile telephone terminal via the communications portion, the control portion determines that the trigger condition is satisfied.

57. The driving recorder according to claim 56, wherein the driving condition data includes image data of an area surrounding the vehicle or an interior of the vehicle.

58. The driving recorder according to claim 56, further comprising:

a warning portion arranged to provide a sound, an image, or a combination thereof, wherein the control portion is arranged to control the warning portion, based on traffic accident data or accumulated traffic accident data transferred from the mobile telephone terminal, to thereby permit the warning portion to alert a driver of the vehicle.

59. A mobile telephone terminal comprising:

a transfer functional part arranged such that, in response to receiving driving condition data from a driving recorder, the transfer functional part transfers the driving condition data to a predetermined server via a mobile telephone line, the driving recorder comprising:

a data collecting portion arranged to continuously collect the driving condition data of a vehicle;

a storage portion arranged to store the driving condition data in a non-volatile manner;

a communications portion arranged to perform mutual communications with the mobile telephone terminal, using a cable or wirelessly; and a control portion arranged to comprehensively control the data collecting portion, the storage portion, and the communications portion, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the communications portion to thereby permit the communications portion to transmit the driving condition data to the mobile telephone terminal, and that, regardless of whether or not the predetermined trigger condition is satisfied, the control portion controls the storage portion to thereby permit the storage portion to continuously store the driving condition data without interruption, and wherein the control portion is arranged such that, in response to receiving a request from the mobile telephone terminal via the communications portion, the control portion determines that the trigger condition is satisfied.

60. The mobile telephone terminal according to claim 59, further comprising:

a transmission request functional part arranged to send, to the driving recorder, a request for transmitting the driving condition data, in accordance with predetermined user operation or a request from the server.

61. The mobile telephone terminal according to claim 59, wherein the transfer functional part is arranged to transfer, to the driving recorder, traffic accident data or accumulated traffic accident data transmitted from the server.

62. An apparatus comprising a mobile telephone terminal comprising an arithmetic processing portion for executing a program for the mobile telephone terminal;

wherein execution of the program enables the arithmetic processing portion to function as a transfer functional part that, in response to receiving driving condition data from a driving recorder, transfers the driving condition data to a predetermined server via a mobile telephone line, wherein the driving recorder comprises:

a data collecting portion arranged to continuously collect the driving condition data of a vehicle;

a storage portion arranged to store the driving condition data in a non-volatile manner;

a communications portion arranged to perform mutual communications with the mobile telephone terminal using a cable or wirelessly; and a control portion arranged to comprehensively control the data collecting portion, the storage portion, and the communications portion, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the communications portion to thereby permit the communications portion to transmit the driving condition data to the mobile telephone terminal, and that, regardless of whether or not the predetermined trigger condition is satisfied, the control portion controls the storage portion to thereby permit the storage portion to continuously store the driving condition data without interruption, and wherein the control portion is arranged such that, in response to receiving a request from the mobile telephone terminal via the communications portion, the control portion determines that the trigger condition is satisfied.

63. A server comprising:

a communications functional part arranged to communicate with a mobile telephone terminal via a mobile telephone line;

wherein the mobile telephone terminal comprises:

a transfer functional part arranged such that, in response to receiving driving condition data from a driving recorder, the transfer functional part transfers the driving condition data to the server via the mobile telephone line, wherein the driving recorder comprises:

a data collecting portion arranged to continuously collect the driving condition data of a vehicle;

a storage portion arranged to store the driving condition data in a non-volatile manner;

a communications portion arranged to perform mutual communications with the mobile telephone terminal, using a cable or wirelessly; and a control portion arranged to comprehensively control the data collecting portion, the storage portion, and the communications portion, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the communications portion to thereby permit the communications portion to transmit the driving condition data to the mobile telephone terminal, and that, regardless of whether or not the predetermined trigger condition is satisfied, the control portion controls the storage portion to thereby permit the storage portion to continuously store the driving condition data without interruption, and wherein the control portion is arranged such that, in response to receiving a request from the mobile telephone terminal via the communications portion, the control portion determines that the trigger condition is satisfied.

64. The server according to claim 63, wherein the server is arranged to analyze the driving condition data transferred from the mobile telephone terminal, and then generate traffic accident data.

65. The server according to claim 63, wherein the server is arranged to analyze and accumulate a plurality of sets of the traffic accident data, and thereby generate accumulated traffic accident data.

66. A traffic information system comprising:

a driving recorder;

a mobile telephone terminal; and a server, wherein the driving recorder comprises:

a data collecting portion arranged to continuously collect driving condition data of a vehicle;

a storage portion arranged to store the driving condition data in a non-volatile manner;

a communications portion arranged to perform mutual communications with the mobile telephone terminal, using a cable or wirelessly; and a control portion arranged to comprehensively control the data collecting portion, the storage portion, and the communications portion, wherein the control portion is arranged to control the communications portion to thereby permit the communications portion to transmit the driving condition data to the mobile telephone terminal and transmit and receive operation setting data to and from the mobile telephone terminal, wherein the control portion is arranged such that, in response to determining that a predetermined trigger condition is satisfied, the control portion controls the communications portion to thereby permit the communications portion to transmit the driving condition data to the mobile telephone terminal, and that, regardless of whether or not the predetermined trigger condition is satisfied, the control portion controls the storage portion to thereby permit the storage portion to continuously store the driving condition data without interruption, and wherein the control portion is arranged such that, in response to receiving a request from the mobile telephone terminal via the communications portion, the control portion determines that the trigger condition is satisfied, wherein the mobile telephone terminal comprises:

a transfer functional part arranged such that, in response to receiving the driving condition data from the driving recorder, the transfer functional part transfers the driving condition data to the server via a mobile telephone line, wherein the server comprises:

a communications functional part arranged to communicate with the mobile telephone terminal via the mobile telephone line.

* * * * *